United States Patent
Tsien et al.

(10) Patent No.: US 12,093,689 B2
(45) Date of Patent: Sep. 17, 2024

(54) SHARED DATA FABRIC PROCESSING CLIENT RESET SYSTEM AND METHOD

(71) Applicants: ADVANCED MICRO DEVICES, INC., Santa Clara, CA (US); ATI TECHNOLOGIES ULC, Markham (CA)

(72) Inventors: Benjamin Tsien, Santa Clara, CA (US); Alexander J. Branover, Boxborough, MA (US); John Petry, Santa Clara, CA (US); Chen-Ping Yang, Santa Clara, CA (US); Rostyslav Kyrychynskyi, Markham (CA); Vydhyanathan Kalyanasundharam, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/032,301

(22) Filed: Sep. 25, 2020

(65) Prior Publication Data

US 2022/0100504 A1     Mar. 31, 2022

(51) Int. Cl.
  *G06F 11/14*    (2006.01)
  *G06F 1/30*     (2006.01)
  *G06F 9/30*     (2018.01)
  *G06F 9/38*     (2018.01)
  *G06F 9/4401*   (2018.01)
  (Continued)

(52) U.S. Cl.
  CPC .......... *G06F 9/3005* (2013.01); *G06F 9/3877* (2013.01); *G06F 9/4418* (2013.01); *G06F 9/463* (2013.01); *G06F 13/4022* (2013.01)

(58) Field of Classification Search
  None
  See application file for complete search history.

(56) References Cited

U.S. PATENT DOCUMENTS 4,638,227 A * 1/1987 Katayama .......... G05B 19/4067
                                              700/79
5,237,699 A * 8/1993 Little ........................ G06F 1/30
                                              714/23

(Continued)

FOREIGN PATENT DOCUMENTS

KR    1020160011144 A    1/2016
WO    20150061731        4/2015

OTHER PUBLICATIONS

Naren, "Reset Button", Mar. 29, 2018 (Year: 2018).*

(Continued)

*Primary Examiner* — Hyun Nam (57) ABSTRACT

A processing system that includes a shared data fabric resets a first client processor while operating a second client processor. The first client processor is instructed to stop making requests to one or more devices of the shared data fabric. Status communications are blocked between the first client processor and a memory controller, the second client processor, or both, such that the first client processor enters a temporary offline state. The first client processor is indicated as being non-coherent. Accordingly, when the processor is reset some errors and efficiency losses due messages sent during or prior to the reset are prevented.

20 Claims, 4 Drawing Sheets

(51) Int. Cl.
  *G06F 9/46* (2006.01)
  *G06F 13/40* (2006.01)

(56) References Cited

U.S. PATENT DOCUMENTS

| | | | | |
|---|---|---|---|---|
| 5,781,770 A | * | 7/1998 | Byers | G06F 11/1438 |
| | | | | 714/24 |
| 10,467,138 B2 | | 11/2019 | Blinzer et al. | |
| 10,705,958 B2 | | 7/2020 | Boyer et al. | |
| 2003/0185305 A1 | * | 10/2003 | MacInnis | H04N 19/122 |
| | | | | 375/E7.199 |
| 2004/0205747 A1 | | 10/2004 | Bernstein et al. | |
| 2004/0215792 A1 | * | 10/2004 | Koning | G06F 9/505 |
| | | | | 709/229 |
| 2005/0177634 A1 | * | 8/2005 | Scudder | H04L 45/22 |
| | | | | 709/225 |
| 2005/0240625 A1 | * | 10/2005 | Chang | G06Q 10/08 |
| 2005/0255894 A1 | * | 11/2005 | Heller | G06F 9/442 |
| | | | | 455/574 |
| 2006/0034251 A1 | * | 2/2006 | Sivabalan | H04L 45/00 |
| | | | | 370/351 |
| 2007/0050559 A1 | * | 3/2007 | Alsup | G06F 12/0862 |
| | | | | 711/E12.075 |
| 2007/0130295 A1 | * | 6/2007 | Rastogi | H04L 49/357 |
| | | | | 709/220 |
| 2008/0082707 A1 | * | 4/2008 | Gupta | G06F 13/364 |
| | | | | 710/110 |
| 2008/0174822 A1 | * | 7/2008 | Kaimi | H04N 5/3572 |
| | | | | 358/1.16 |
| 2010/0121957 A1 | * | 5/2010 | Roy | H04L 63/1466 |
| | | | | 709/227 |
| 2011/0153924 A1 | * | 6/2011 | Vash | G06F 12/0815 |
| | | | | 711/146 |
| 2012/0137119 A1 | | 5/2012 | Doerr et al. | |
| 2012/0166618 A1 | * | 6/2012 | Dahod | H04L 47/20 |
| | | | | 709/224 |
| 2012/0179898 A1 | * | 7/2012 | Betouin | G06F 21/71 |
| | | | | 712/E9.016 |
| 2013/0339663 A1 | * | 12/2013 | Chang | G06F 13/14 |
| | | | | 712/29 |
| 2014/0082251 A1 | * | 3/2014 | Li | G06F 13/4282 |
| | | | | 710/316 |
| 2015/0269039 A1 | * | 9/2015 | Akirav | G06F 11/1423 |
| | | | | 714/4.11 |
| 2016/0055113 A1 | * | 2/2016 | Hodge | G06F 13/4027 |
| | | | | 710/308 |
| 2016/0188503 A1 | * | 6/2016 | Hallnor | G06F 13/24 |
| | | | | 710/262 |
| 2017/0325088 A1 | * | 11/2017 | Newham | H04W 12/33 |
| 2018/0091589 A1 | * | 3/2018 | Radley | H04L 67/1029 |
| 2018/0285264 A1 | | 10/2018 | Kayiran et al. | |
| 2019/0132381 A1 | * | 5/2019 | Momchilov | G06F 3/01 |
| 2022/0100504 A1 | * | 3/2022 | Tsien | G06F 9/3005 |
| 2022/0224829 A1 | * | 7/2022 | Naito | G06V 10/94 |
| 2023/0089489 A1 | * | 3/2023 | Otani | G06F 3/0659 |
| 2023/0092784 A1 | * | 3/2023 | Venkatesh | G06F 1/3228 |

OTHER PUBLICATIONS

Mike Willams, "How to restart your graphics driver instantly with a key combination", Circa 2016 (Year: 2016).*
International Search Report and Written Opinion mailed Jan. 19, 2022 for PCT/US2021/052004, 11 pages.
International Preliminary Report on Patentability issued in Application No. PCT/US2021/052004, mailed Apr. 6, 2023, 8 pages.
Extended European Search Report issued in Application No. 21873538.9, mailed Jun. 28, 2024, 15 pages.

* cited by examiner

SHARED DATA FABRIC PROCESSING CLIENT RESET SYSTEM AND METHOD

BACKGROUND

Shared data fabric systems include a variety of heterogeneous processing clients, including, in some cases, various central processing units (CPUs), graphic processing units (GPUs), digital signal processors (DSPs), other parallel processors, other specialized devices, or any combination thereof. Some processing clients when standalone, such as GPUs, can be reset during operation of the system without causing errors at other components because those components do not share a same coherent data fabric with other processing clients. However, in shared data fabric systems, because processing clients frequently send status communications including probes and status requests to each other, resetting processing clients while status communications are outstanding causes unintended consequences such as system failures or degraded system performance.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

A processing system includes a shared data fabric that connects a plurality of processing clients. The processing clients send status communications (e.g., packets and probes) to each other and to various other devices of the processing system such as a memory controller. In some embodiments, as described herein, the processing system resets a first one of the processing clients (e.g., a parallel processing unit such as a GPU) without resetting the system as a whole or the other processing clients (e.g., a CPU). In particular, the processing system intercepts, blocks, and/or spoofs status communications between the first processing client and other devices of the processing system. As a result, the first processing client enters a temporary offline state in which the first processing client continues to service requests, but the processing system sends status communications as if the first processing client were offline. Eventually, the first processing client enters a state in which the various other devices are not performing operations on behalf of the first processing client and in which the first processing client is not expected to send messages to the various other devices. At that point, the first processing client is reset and the processing system stops intercepting, blocking, and/or spoofing communications. Due to the procedures described herein, various potential errors, losses of efficiency, or both, described below are avoided despite the reset of the first processing client.

In some cases, various issues occur as a result of a naive reset of a first processing client (e.g., a GPU). For example, if a CPU sends a probe request to the GPU and the GPU is reset before responding to the probe, in some cases, no response to the probe is sent. As a result, in some cases, the CPU will experience a potentially fatal error if no response to the probe request is received. As another example, if processing credits are allocated to the GPU before the GPU is reset and the GPU does not release those processing credits, in some cases, the GPU is unaware of those processing credits subsequent to the reset, causing the processing credits to be unused by the system as a whole, degrading system performance. As yet another example, if the GPU sends a communication (e.g., a status request) to the CPU before the GPU is reset but the CPU does not respond to the communication until after the GPU is reset, subsequent to being reset, the GPU is no longer looking to receive a response. In some cases, the GPU is unaware of sending the communication. As a result, if the GPU receives a response to the communication from the CPU after the GPU is reset, in some cases, the GPU registers the communication as an error or the GPU mistakenly registers the response as being in response to another communication.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). For ease of illustration, reference is made herein to example contexts in which GPUs are employed. However, it will be understood that the systems and techniques described herein apply equally to the use of other types of parallel processors unless otherwise noted.

Figure 1:
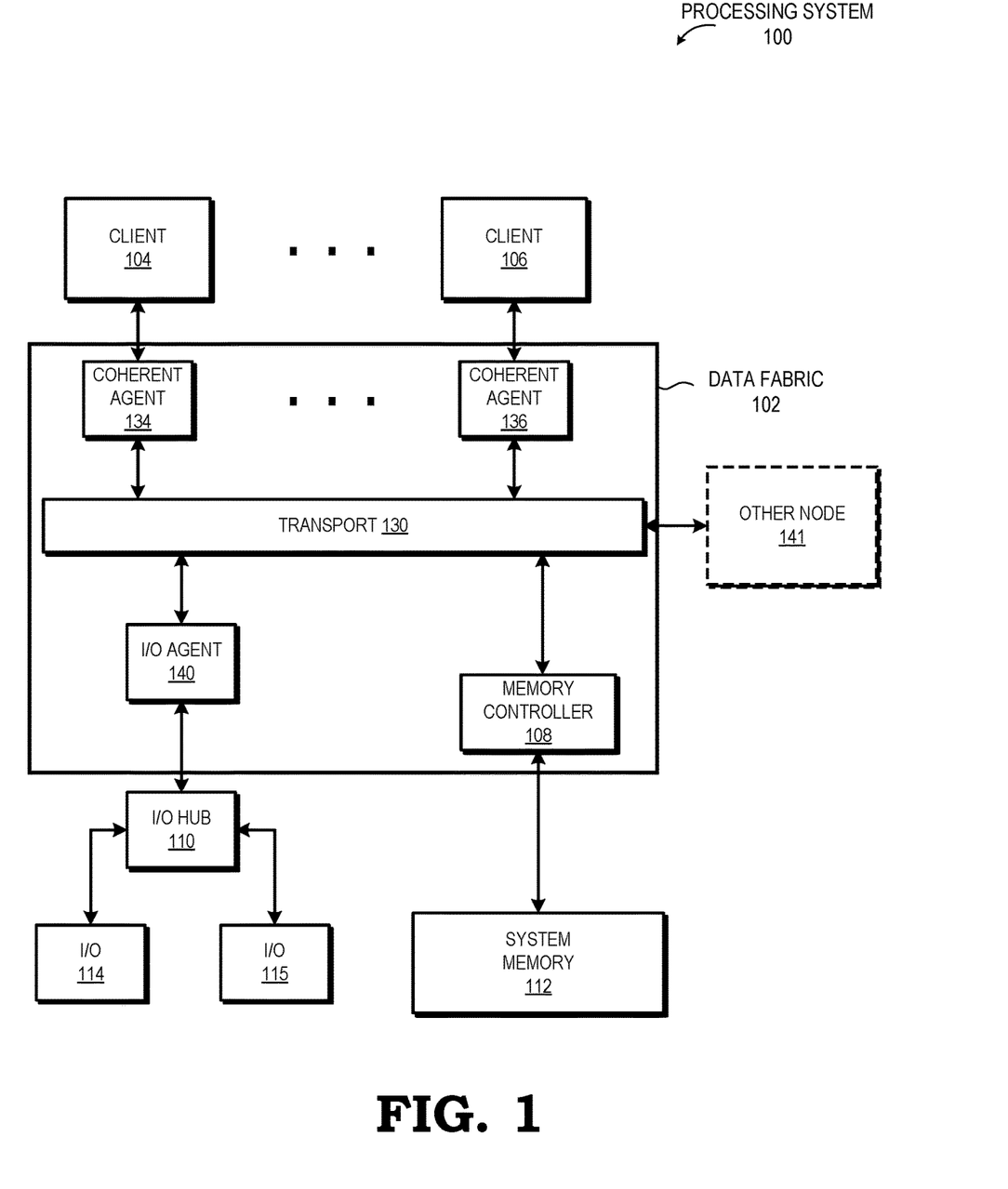
FIG. 1 is a block diagram of a shared data fabric processing system including a plurality of processing clients in accordance with some embodiments.

FIG. 1 illustrates a processing system 100 that resets a processing client in accordance with at least some embodiments. The processing system 100 includes a data fabric 102 used to interconnect various components of processing system 100, including a plurality of processing clients, such as processing clients 104-106, one or more memory controllers 108, and one or more I/O hubs 110. Each memory controller 108 in turn is coupled to a system memory 112, and each I/O hub 110 is in turn coupled to one or more I/O devices, such as I/O devices 114, 115.

Processing clients 104-106 include one or more processor cores and a local cache hierarchy. The processor cores include, for example, CPU cores, GPU cores, DSP cores, parallel processor cores, or a combination thereof. The local cache hierarchy of a processing client includes one or more levels of cache. In some embodiments, at least one of processing clients 104-106 differs from at least one other of processing clients 104-106 (i.e., processing clients 104-106 are heterogeneous). In other embodiments, processing clients 104-106 are homogeneous.

The memory controller 108 operates as the interface between the corresponding system memory 112 and the other components of processing system 100. Thus, data to be cached in a local cache hierarchy of a processing client typically is manipulated as blocks of data referred to as "cache lines", and which are addressed or otherwise located in a memory hierarchy using a physical address of system memory 112. Cache lines are accessed from the system memory 112 by the memory controller 108 in response to access requests from a processing client, and the cache lines are installed, or cached, in one or more caches of the processing client. Likewise, when a cache line containing modified data is evicted from a local cache hierarchy of a processing client, and thus needs to be updated in system memory 112, memory controller 108 manages this write-back process.

I/O devices 114, 115 operate to transfer data into and out of the node 101 using DMA access operations. For example, one of the I/O devices 114, 115 can include a network interface card (NIC) for connecting the node to a network for receiving and transmitting data, or hard disk drive (HDD) or other mass storage device for non-volatile storage of relatively large quantities of data for use by processing clients 104-106, and the like. In at least one embodiment, I/O hub 110 manages I/O devices 114, 115 and serves as an interface between data fabric 102 and I/O devices 114, 115. To illustrate, in some embodiments, I/O hub 110 includes a Peripheral Component Interconnect Express (PCIe) root complex so as to operate as a PCIe interconnect between I/O devices 114, 115 and data fabric 102.

Data fabric 102 includes transport layer 130 and a plurality of coherent agents 134-136 that operate as interfaces between the transport layer 130 and respective processing clients 104-106. Additionally, memory controller 108 operates as a coherent agent for system memory 112. However, in other embodiments, memory controller 108 is located outside data fabric 102 and a separate coherent agent for memory controller 108 and system memory 112 is included. I/O agent 140 operates as a coherent agent for I/O hub 110 and I/O devices 114, 115. Further, in some embodiments, transport layer 130 is coupled to the corresponding transport layer of one or more other nodes 141 via a bridge component (not shown). In various embodiments, data fabric 102 is compatible with one or more standardized interconnect specifications, such as a HyperTransport™ specification or an Infinity Fabric™ specification.

As a general operational overview, data fabric 102 transports commands, data, requests, status communications, and other signaling among the other components of processing system 100, and between processing system 100 and other nodes 141. One such subset of these transport operations is the storage of data provided by the I/O devices 114, 115 for use by one or more of processing clients 104-106. As further described below with reference to FIG. 3, another subset of these transport operations is sending packets (e.g., read requests and responses or write requests and responses) from memory controller 108 or a processing client (e.g., processing client 104) to another processing client (e.g., processing client 106). As further described below with reference to FIG. 4, another subset includes status communications such as probes sent from memory controller 108 or a processing client (e.g., processing client 104) to another processing client (e.g., processing client 106).

In some cases, such as due to an error or failure, processing system 100 determines that a processing client is to be reset. In various embodiments, this determination is made by a corresponding coherent agent, memory controller 108, the processing client to be reset, by another processing client, or by another device. As mentioned above, in some cases, a naive reset of the processing client causes various errors, failures, or losses of efficiency. Accordingly, as further discussed below with reference to FIG. 2, some or all of various procedures are taken to prevent problems associated with resetting the processing client. In some embodiments, processing system 100 can reset any of processing clients 104-106 without resetting the remainder of processing system 100. In other embodiments, one or more of processing clients 104-106 cannot be reset without resetting the remainder of processing system 100.

Figure 2:
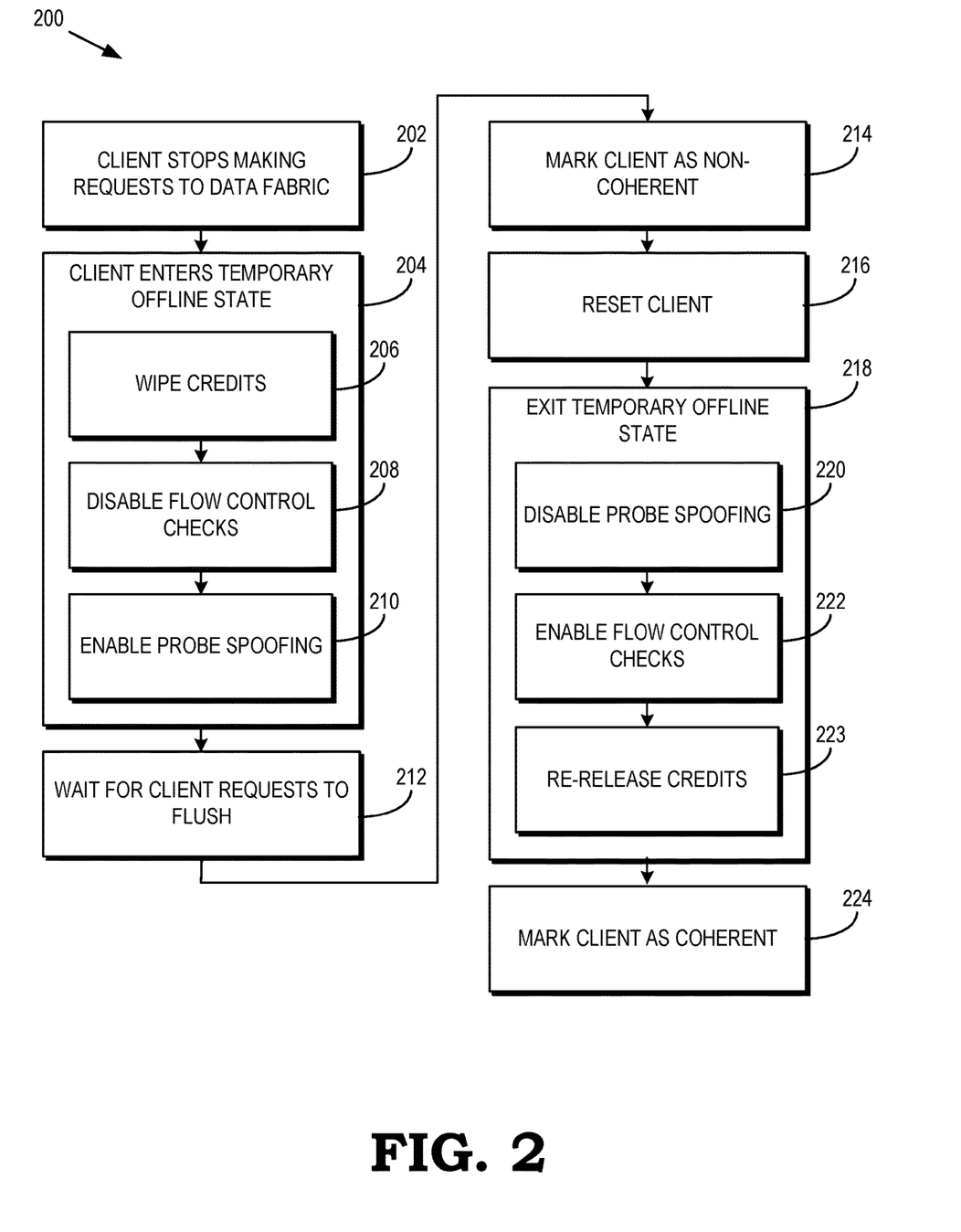
FIG. 2 is a flow diagram of a method of resetting a processing client in a shared data fabric processing system in accordance with some embodiments.

FIG. 2 is a flow diagram illustrating a method 200 of resetting a processing client in a shared data fabric processing system in accordance with some embodiments. Method 200 is implemented, in some embodiments, by a corresponding coherent agent, a memory controller, by a portion of the processing client to be reset, or by another processing client. In some embodiments, method 400 is initiated by one or more processors in response to one or more instructions stored by a computer-readable storage medium. In some cases, method 200 includes fewer blocks (e.g., flow control checks are not disabled because flow control checks are already disabled for another reason) or additional blocks.

At block 202, the processing client is instructed to stop making requests to a data fabric. For example, processing client 106 stops making requests to memory controller 108 and to processing client 104 of data fabric 102. In some cases, stopping making requests includes one or more of terminating chained writes and finishing requested writes. In various embodiments, this stoppage of requests coincides with a clean request boundary.

At block 204, the processing client is instructed to enter a temporary offline state in which various communications such as status communications and read and write requests are at least partially blocked or intercepted between the processing client and the memory controller or between the processing client and other processing clients or devices of the processing system. For example, processing client 106 enters a temporary offline state. As a result of the processing client being in the temporary offline state, in some embodiments, incoming coherence messages from other processing clients will continue to be serviced but the processing client will appear to be offline to the other processing clients. In the illustrated embodiment, block 204 includes blocks 206-210.

At block 206, processing credits of the processing client are wiped. For example, processing credits tracked by coherent agent 136 and used to prevent processing client 106 from receiving more tasks than processing client can perform within a certain amount of time are treated as being allocated. As a result, in some cases, other devices of processing system 100 are prevented from sending tasks to processing client 106.

At block 208, flow control checks of the processing client are disabled. For example, flow control checks on responses and probe requests to processing client 106 are disabled.

At block 210, spoofing of responses to probes sent to the processing client is enabled. For example, spoofed probe responses are generated by coherence agent 136 and sent in response to probes sent from processing client 104 to processing client 106. As a result, responses to probes sent to processing client 106 include indications of cache misses.

At block 212, the processing system waits for requests by the processing client to flush out of the system. For example, processing system 100 waits for read requests, write requests, status communications, probes, and other communications by processing client 106 to resolve. In various embodiments, the processing system waits ten nanoseconds or one hundred microseconds. In some embodiments, the amount of time waited is stored at a memory such as system memory 112 or a memory of coherent agent 136.

At block 214, the processing client is marked as non-coherent. For example, processing client 106 is marked as non-coherent because its cache has been flushed. As a result, in the illustrated embodiment, probes are no longer targeted at processing client 106 because processing client 106 is no longer a cache hit. In some embodiments, method 400 waits for probes targeting processing client 106 to complete (e.g., by sending spoofed probe responses).

At block 216, the processing client is reset. For example, in some cases, processing client 106 is reset, which causes an interface of processing client 106 to return to a reset initialization state. Coherent agent 136 is told to treat processing client 106 as having a software fused off state. Accordingly, processing client 106 resets even though other portions of processing system 100 remain online. In some embodiments, exiting the fused off state as part of resetting the processing client resets a number of processing credits of the processing client.

At block 218, the processing client exits the temporary offline state. For example, the various communications to processing client 106 are no longer blocked or intercepted. In the illustrated embodiment, block 218 includes blocks 220, 222, and 223.

At block 220, spoofing of responses to probes sent to the processing client is disabled. For example, spoofed responses are no longer sent in response to probes sent to processing client 106. At block 222, flow control checks are enabled. At block 223, the processing credits of the processing client are re-released and available to be allocated to other components of the processing system.

At block 224, the processing client is marked as coherent. As a result, in some cases, probes in processing system 100 once again target processing client 106. Accordingly, the processing client is reset.

Figure 3:
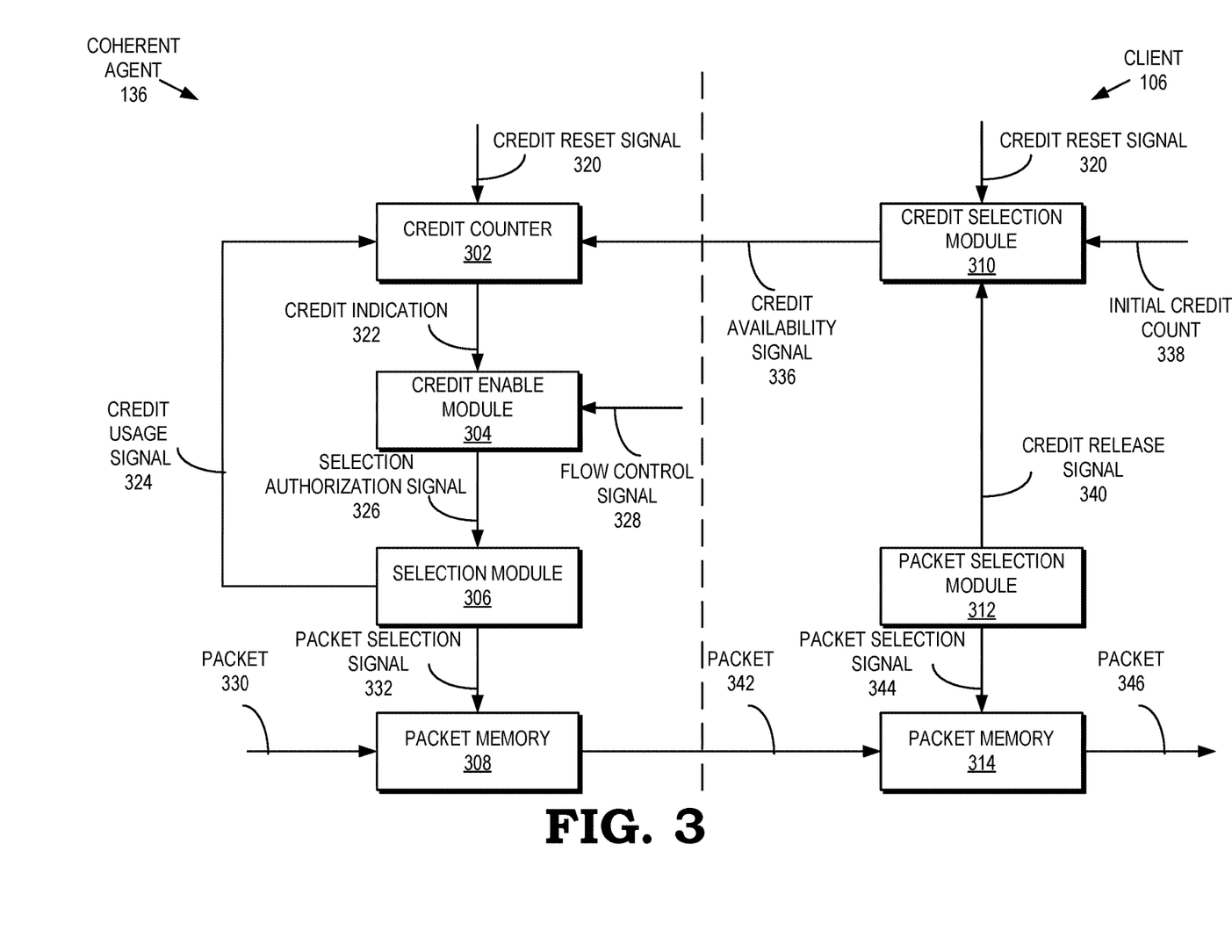
FIG. 3 is a block diagram of a portion of a shared data fabric processing system that uses processing credits to send packets to a processing client in accordance with some embodiments.

FIG. 3 is a block diagram illustrating usage of processing credits to process packets at processing client 106 of FIG. 1 in accordance with some embodiments. In the illustrated embodiment, coherent agent 136 includes credit counter 302, credit enable module 304, selection module 306, and packet memory 308. Processing client 106 includes credit selection module 310, packet selection module 312, and packet memory 314. Although the illustrated embodiment shows a specific configuration of components, in various embodiments, other combinations of components are contemplated. Further, in some embodiments, additional components such as buffers or repeaters are contemplated but not illustrated for ease of discussion.

Packet selection module 312 instructs packet memory 314 to send packet 346 to an addressed portion of processing client 106 (e.g., a processor core, a memory device, etc.). In some embodiments, packet selection module 312 specifies the packet to be sent. In other embodiments, packet memory 314 is a queue and a next packet is sent.

As described above, processing credits are used to manage requests assigned to processing client 106. Accordingly, packet selection module 312 also sends credit release signal 340 to credit selection module 310, indicating a number of credits to be released. Credit selection module 310 sends an indication of available credits to credit counter 302 as credit availability signal 336. As mentioned above with reference to FIG. 2, in some embodiments, resetting processing client 106 includes releasing processing credits after the processing client 106 has reset. Initial credit count 338 indicates an initial number of processing credits available before those processing credits are used. Credit selection module 310 selects between sending credit release signal 340 and initial credit count 338 to credit counter 302 as credit availability signal 336 based on credit reset signal 320, which is asserted as part of a reset process of processing client 106 where the processing credits are re-released.

Credit counter 302 keeps track of a number of available processing credits of processing client 106. In the illustrated embodiment, in response to credit availability signal 336 from credit selection module 310, which indicates a number of newly available credits at processing client 106, a number of available processing credits is increased. In response to credit usage signal 324 from selection module 306, a number of available processing credits is decreased. As discussed above, as part of resetting processing client 106, processing credits of processing client 106 are wiped. In some embodiments, credit reset signal 320 indicates that no processing credits are available. In the illustrated embodiment, credit reset signal 320 is sent to both credit counter 302 and credit selection module 310. In other embodiments, separate signals are sent to credit counter 302 and credit selection module 310. Credit counter 302 indicates whether credits are available to credit enable module 304 via credit indication 322.

Credit enable module 304 selectively enables or disabled processing of packets based on whether processing credits are available and whether flow control signal 328 is enabled. If no credits are available or flow control signal 328 is disabled, which, as discussed above with reference to FIG. 2, occurs in some embodiments as part of a processing client reset process, credit enable module 304 indicates, via selection authorization signal 326, that selection module 306 is authorized to select a communication (e.g., a packet or a probe) to send to processing client 106.

In response to selection authorization signal 326, selection module 306 indicates, via packet selection signal 332, that packet memory 308 is authorized to send a packet to processing client 106. In some embodiments, selection module 306 specifies the packet to be sent. In other embodiments, packet memory 308 is a queue and a next packet is sent. Additionally, selection module 306 sends credit usage signal 324 to credit counter 302, indicating that a packet is being sent to processing client 106. As further discussed below with reference to FIG. 4, in some embodiments, selection module 306 further indicates that other communications (e.g., probes) are authorized to be sent to processing client 106 and, in some cases, sends credit usage signal 324 in response to authorizing the other communications.

An incoming request is sent to packet memory 308 as packet 330. Packet memory 308 stores the packet until selection module 306 indicates, via packet selection signal 332, that the packet should be sent to packet memory 314 as packet 342. Similarly, packet memory 314 stores the packet until packet selection module 312 indicates, via packet selection signal 344, that the packet should be sent to an addressed portion of processing client 106 (e.g., a processor core, a memory device, etc.).

Figure 4:
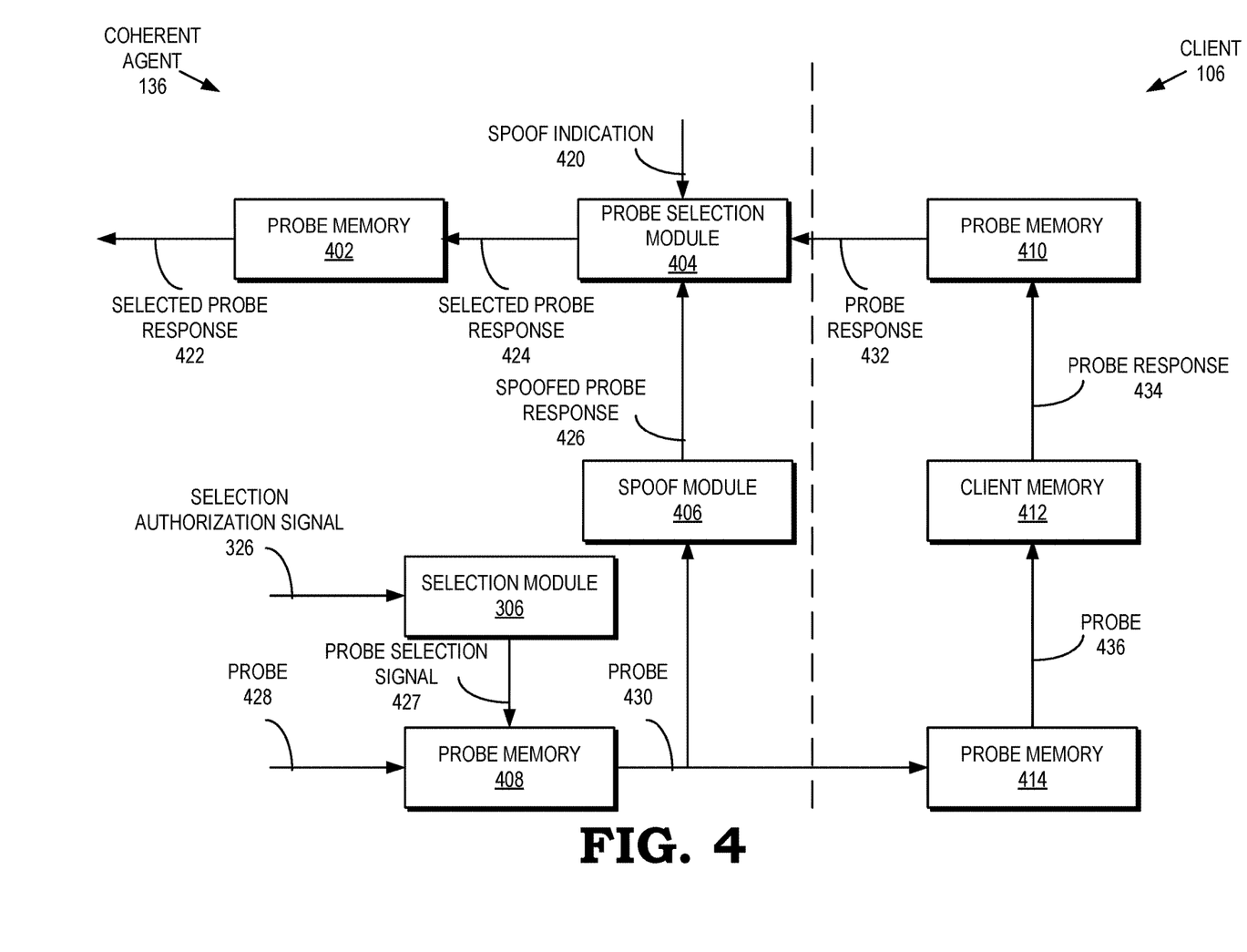
FIG. 4 is a block diagram of a portion of a shared data fabric processing system that manages probes in accordance with some embodiments.

FIG. 4 is a block diagram illustrating management of probes that address processing client 106 of FIG. 1 in accordance with some embodiments. In the illustrated embodiment, coherent agent 136 includes probe memory 402, probe selection module 404, spoof module 406, selection module 306 of FIG. 3, and probe memory 408. Processing client 106 includes probe memory 410, client memory 412, and probe memory 414. Although the illustrated embodiment shows a specific configuration of components, in various embodiments, other combinations of components are contemplated. Further, in some embodiments, additional components such as buffers or repeaters are contemplated but not illustrated for ease of discussion.

Probe 428 is received from another device of processing system 100 (e.g., memory controller 108 or processing client 104) and stored at probe memory 408. As discussed above with reference to FIG. 3, selection module 306 receives selection authorization signal 326 that indicates that selection module 306 is authorized to select a communication (e.g., a packet or a probe) to send to processing client 106. In the illustrated embodiment, in response to selection authorization signal 326, selection module 306 indicates, via probe selection signal 427, that probe memory 408 is authorized to send a probe to processing client 106 as probe 430. In some embodiments, selection module 306 specifies the probe to be sent. In other embodiments, probe memory 408 is a queue and a next probe is sent. Probe memory 408 sends the selected probe as probe 430 to probe memory 414 and to spoof module 406.

Probe memory 414 receives probe 430 and sends the probe to client memory 412 as probe 436. Probe 436 is processed at client memory 412 and a resulting probe response 434 is generated and sent to probe memory 410. Probe memory 410 receives probe response 434 and sends it to probe selection module 404 as probe response 432.

As mentioned above with reference to FIG. 2, in some embodiments, resetting processing client 106 includes responding to some probes with spoofed probe responses. Accordingly, probe 430 is sent to spoof module 406. Spoof module 406 generates spoofed probe response 426 in response to probe 430 and sends spoofed probe response 426 to probe selection module 404. In the illustrated embodiment, spoofed probe response 426 indicates a cache miss at processing client 106. However, in other embodiments, spoofed probe response 426 indicates other things, such as that processing client 106 is being reset. In some embodiments, spoof module 406 generates a spoofed probe response in response to each received probe. In other embodiments, spoof module 406 is enabled as part of a reset process of processing client 106.

Probe selection module 404 selects between probe response 432 and spoofed probe response based on spoof indication 420. In the illustrated embodiment, spoof indication 420 indicates whether spoofing of probe responses is enabled (e.g., as part of a reset process of processing client 106). If spoofing of probe responses is enabled, spoofed probe response 426 is selected and output as selected probe response 424. Otherwise, probe response 432 is selected and output as selected probe response 424. Probe memory 402 receives selected probe response 424 and outputs the probe response as selected probe response 422 to a requesting device, to memory controller 108, or to another device of processing system 100.

In some embodiments, the apparatus and techniques described above are implemented in a system including one or more integrated circuit (IC) devices (also referred to as integrated circuit packages or microchips), such as the processing systems described above with reference to FIGS. 1-4. In some embodiments, electronic design automation (EDA) and computer aided design (CAD) software tools are used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device is stored in and accessed from the same computer readable storage medium or a different computer readable storage medium.

In some embodiments, a computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. In some embodiments, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. In some embodiments, the executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not required, and that, in some cases, one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter could be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above could be altered or modified and all such variations are considered within the scope of the disclosed subject matter. Accordingly, the protection sought herein is as set forth in the claims below.

Within this disclosure, in some cases, different entities (which are variously referred to as "components," "units," "devices," etc.) are described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

What is claimed is:

1. A method comprising:
   based on a reset of a first client processor of a shared data fabric processing system and without resetting a second client processor of the shared data fabric processing system:
      instructing the first client processor to stop making requests to one or more devices of the shared data fabric processing system;
      blocking status communications between the first client processor and a memory controller of the shared data fabric processing system; and
      causing the first client processor to reset; and
   reenabling the first client processor.

2. The method of claim 1, further comprising stopping, by the first client processor, the requests to the one or more devices of the shared data fabric processing system by terminating chained write operations and completing write operations.

3. The method of claim 1, further comprising:
   subsequent to blocking the status communications, indicating that the first client processor is non-coherent to the memory controller.

4. The method of claim 3, wherein reenabling the first client processor comprises:
   allowing the status communications between the first client processor and the memory controller to resume; and
   indicating that the first client processor is coherent to the memory controller.

5. The method of claim 4,
   wherein blocking the status communications causes the first client processor to enter a temporary offline state, and
   wherein allowing the status communications to resume causes the first client processor to exit the temporary offline state.

6. The method of claim 5, further comprising:
   subsequent to the first client processor entering the temporary offline state and prior to indicating that the first client processor is non-coherent, waiting for remaining status requests to the first client processor to be answered.

7. The method of claim 4,
   wherein blocking the status communications comprises disabling flow control checks on status responses by the first client processor, and
   wherein allowing the status communications to resume comprises enabling flow control checks on status responses by the first client processor.

8. The method of claim 4,
   wherein blocking the status communications comprises enabling a spoofing of probes sent to the first client processor, and
   wherein allowing the status communications to resume comprises disabling the spoofing of probes sent to the first client processor.

9. The method of claim 8, wherein enabling the spoofing of probes comprises sending, by a coherent agent associated with the first client processor, a spoofed probe response generated in response to a probe addressed to the first client processor.

10. The method of claim 9, wherein enabling the spoofing of probes comprises generating, by a coherent agent associated with the first client processor, the spoofed probe response.

11. The method of claim 1, further comprising instructing a coherent agent associated with the first client processor to treat the first client processor as having a fused off state in a data fabric of the shared data fabric processing system.

12. An integrated circuit (IC) comprising:
   a parallel processing unit;
   a central processing unit (CPU); and
   a data fabric comprising:
      a memory controller configured to:
         send status communications from the CPU to the parallel processing unit,
            wherein the status communications comprise packets and probes; and
      a coherent agent configured to:
         reset the parallel processing unit without resetting the CPU;
         in response to the reset of the parallel processing unit, block the status communications between the memory controller and the parallel processing unit; and
         triggering a reset of the parallel processing unit.

13. The IC of claim 12, wherein the memory controller is further configured to:
   mark the parallel processing unit as non-coherent subsequent to status communications between the memory controller and the parallel processing unit being blocked for at least a particular amount of time.

14. The IC of claim 12, wherein the coherent agent comprises a credit counter configured to select between a first number of processing credits indicated by a credit availability signal from the parallel processing unit and zero processing credits based on a credit reset signal, and wherein the credit reset signal is sent as part of blocking the status communications between the memory controller and the parallel processing unit.

15. The IC of claim 14, wherein the coherent agent comprises a selection module configured to instruct, based on an indication of processing credits of the parallel processing unit received from the credit counter, one or more memory devices of the coherent agent to send status communications to the parallel processing unit.

16. The IC of claim 12, wherein the coherent agent comprises a spoof module configured to send a spoofed probe response to the memory controller as part of blocking the status communications between the memory controller and the parallel processing unit.

17. A method comprising:
based on a reset of a first client processor of a processing system that comprises at least one graphic processing unit (GPU) and at least one central processing unit (CPU) and without resetting a second client processor of the processing system:
intercepting status communications between the first client processor and a memory controller of a data fabric of the processing system; and
instructing the first client processor to reset; and
reenabling the first client processor.

18. The method of claim 17, wherein processing credits of the first client processor are distributed to one or more devices connected to the data fabric, and wherein intercepting the status communications comprises:
wiping the processing credits of the first client processor; and
resetting the processing credits of the first client processor to an initial credit count.

19. The method of claim 17, further comprising:
instructing the first client processor to stop making requests to one or more devices connected to a data fabric of the processing system; and
preventing processing credits of a second client processor from being allocated to the first client processor.

20. The method of claim 17, wherein intercepting the status communications comprises disabling flow control checks on responses by the first client processor.

* * * * *